Figure 3:
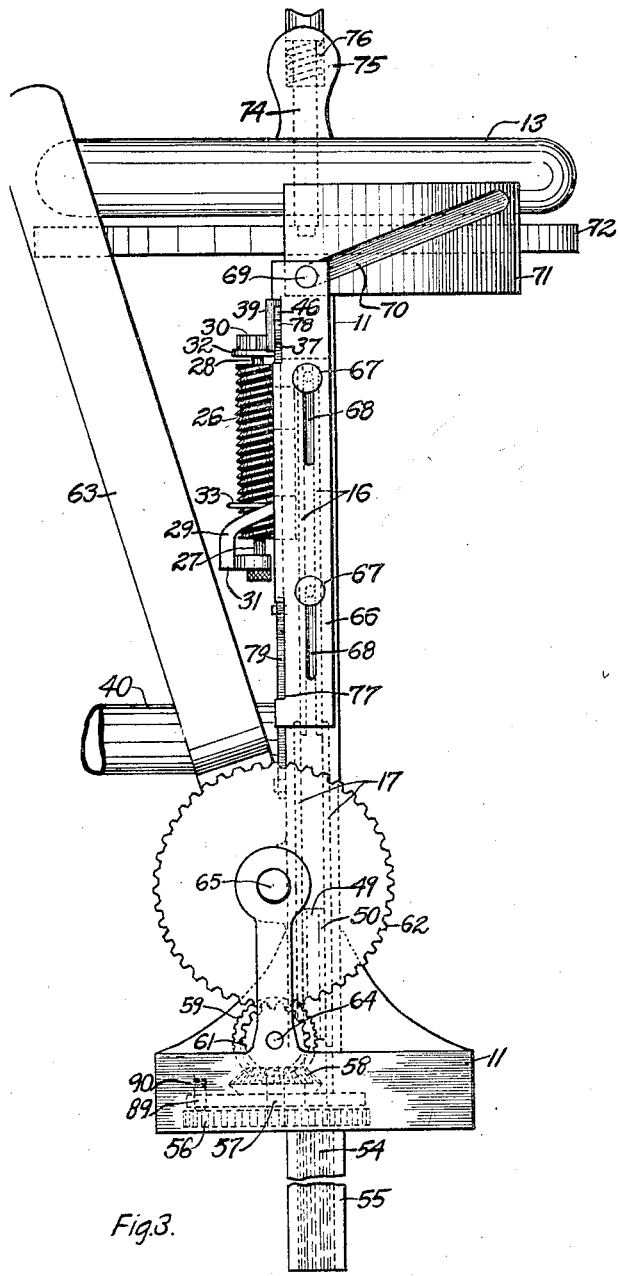

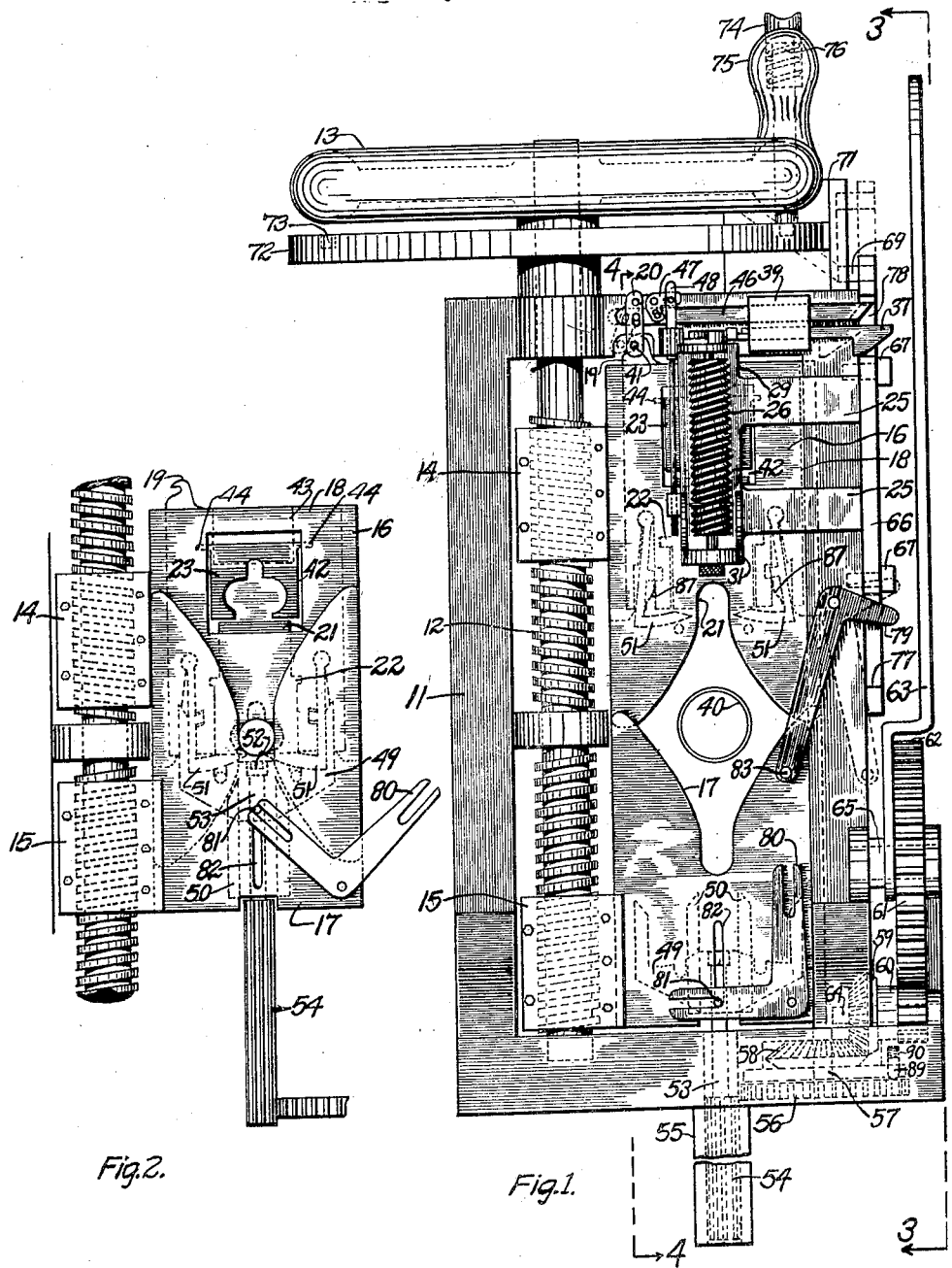

Dec. 16, 1924.
1,519,423

M. THEIMER

BINDING MACHINE FOR BOLOGNAS OR OTHER SIMILAR PRODUCTS

Filed May 25, 1922     3 Sheets-Sheet 2

INVENTOR.
Max Theimer.
BY Emanuel Scheyer.
ATTORNEY

Dec. 16, 1924.
M. THEIMER
BINDING MACHINE FOR BOLOGNAS OR OTHER SIMILAR PRODUCTS
Filed May 25, 1922    3 Sheets-Sheet 3
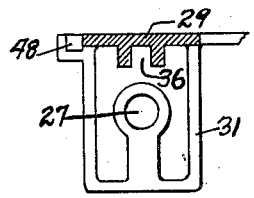
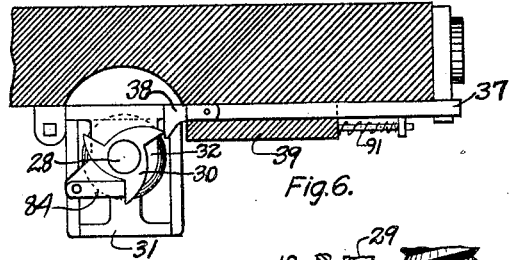
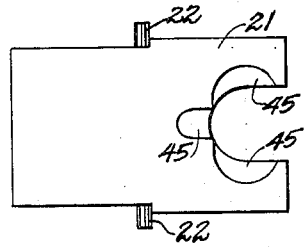
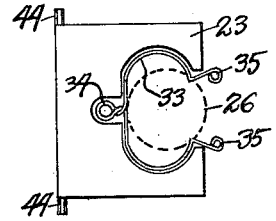
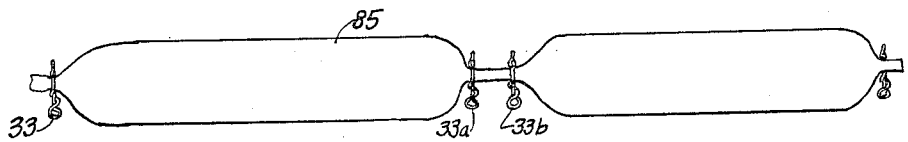
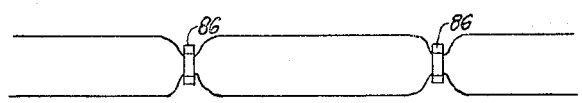
INVENTOR.
Max Theimer.
BY Emanuel Scheyer.
ATTORNEY Patented Dec. 16, 1924.

1,519,423

UNITED STATES PATENT OFFICE.

MAX THEIMER, OF ELIZABETH, NEW JERSEY.

BINDING MACHINE FOR BOLOGNAS OR OTHER SIMILAR PRODUCTS.

Application filed May 25, 1922. Serial No. 563,579.

*To all whom it may concern:*

Be it known that I, MAX THEIMER, a citizen of the United States, residing at Elizabeth, in the county of Union and State of New Jersey, have invented certain new and useful Improvements in binding machines for bolognas or other similar products consisting of a flexible casing filled with loose food particles or food materials with various degrees of fluidity, of which the following is a specification.

My invention relates to the method of forming the bologna, the mechanism for binding same, the means by which its ends are held closed and the type of bologna itself.

At the present time bolognas are formed by forcing the filler through a spout over which is crowded an elongated casing of fabric or gut closed at one end. Special air controlled stuffing machines are used which hold the filler in a drum from which it is forced out through the spout, filling up the casing as it unravels from the spout. After the casing has been stuffed, the pressure is shut off and the filled bologna is held shut at one end with one or both hands as it is removed from the spout. It is then carried over to an assistant who waits with string and ties up the end of said bologna. My mechanism can accomplish the sealing of both ends of the bologna right at the spout and eliminates the closing by hand. In certain kinds of bologna such as frankfurters, the entire length of casing can be stuffed and the links formed afterwards by rerunning the long stuffed casing through the machine and binding it at several points along its length. This can be accomplished away from the spout. The closing by hand is very painful to the workmen and unsanitary as their hands are usually cut by tightening the string, thereby mixing their blood with the food, and whatever antiseptics they use on their hands also. In closing the bologna by hand prior to tying it, a considerable portion of the casing is required on which to place the hands, for which purpose a certain length is reserved, which remains unfilled and which is afterwards cut away as waste. In my invention comparatively thin jaws are used to effect the closure, thereby eliminating the waste of casing.

The ties or fasteners used by me are of suitable metal (preferably non-rusting) or other material of sufficient stiffness to stay in whatever position it is bent. This feature adapts them for rapid and automatic feeding in my tying mechanism. My fastener has advantages even when not used in an automatic machine. It can be used in a hand process of making bologna being fastened on by pliers or other suitable hand tool.

My fastening machine is adapted to be stood on a table next to the spout of the stuffing machine and as the bologna is being formed it passes through an opening in the fastening machine. When the bologna has been sufficiently filled, jaws are closed over the bologna constricting it. A fastener is placed on the constricted portion and then tightly bound on the bologna.

Figure 4:
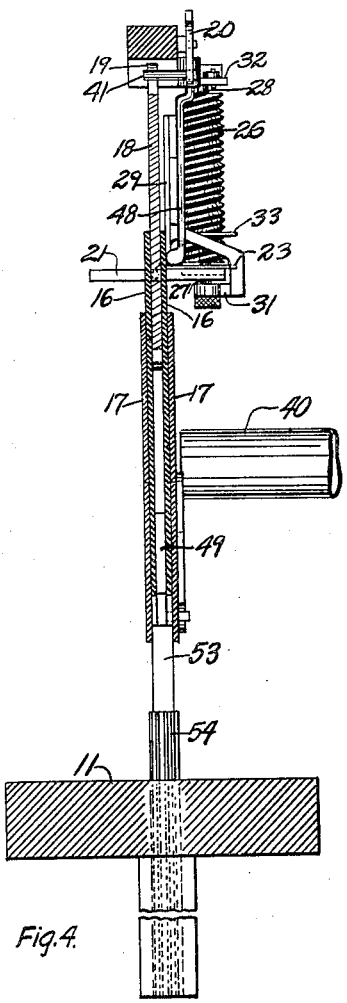

I attain these objects as shown by the following description and by the construction illustrated in the accompanying drawings of which:

Figure 1 is a front elevation of the binding machine in its open position, Figure 2 is a partial front elevation showing the jaws in closed position, Figure 3 is a side view of the machine taken along the line 3—3 of Figure 1, Figure 4 is a section of the machine taken substantially along the position indicated by line 4—4 of Fig. 1, the jaws 16 and 17 however being together as shown in Fig. 2 and not separated as in Fig. 1, Figure 5 is a sectional plan view showing the bottom support of the feed screw, Figure 6 is a top view of the feed screw showing its operating mechanism, Figure 7 is a top view of the main hopper plate, Figure 8 is a partial elevation showing the bottom portion of the feed screw and the hopper plates in position to receive the staple, Figure 9 is a plan view of the retainer plate showing a staple just about to pass through it, Figure 10 is an illustration of my improved bologna with its staple fastening, Figure 11 illustrates a type of binder for fastening the bologna by just being squeezed closed without twisting, Figure 12 shows a string of frankfurters fastened with the binder of Figure 11 and Figure 13 is a top view of the twisting tool.

The main frame 11, which is rectangular in form, carries the closing screw 12. The upper portion of screw 12 is threaded in one direction while the lower portion is threaded in the opposite direction, so that when it is rotated by means of hand wheel 13 fixed to its upper end, nuts 14 and 15 which engage it are moved in opposite directions.

The upper pair of jaw plates 16 carry fixed to them nut 14 while the lower pair of jaw plates 17 are fixed to nut 15. Both pairs of jaw plates slide in slots in the right hand upright of main frame 11. Between the upper jaw plates 16 is located with a sliding fit a plate 18 (Figures 1, 2, 4 and 8). The upper edge of plate 18 is formed with a hook 19, which hangs from the pin 41 located near the bottom end of link 20.

The lower end of plate 18 has a large central notch in which plate 21 fits snugly. With jaw plates 16 and 17 in the positions shown in Figures 1 and 2, plate 21 is held in a vertical position in the notch of plate 18 and between the upper pair of jaw plates 16. Pivots 22 carried by plate 21 fit into recesses in plate 18. Pivots 22 permit the rotation of plate 21 about them when plate 21 is clear of jaw plates 16 as will be explained later.

Plate 23 is pivotally connected by pivots 44 to the front jaw plate 16.

Feed screw 26 is removably held by pivots 27 and 28 in lugs 31 and 32 of frame 29 which in turn is supported by brackets 25 fastened to main frame 11. To the top of pivot 28 is fastened a ratchet wheel 30. Pivot 28 has its lower end squared and fits into a square hole in the top of feed screw 26. Pivot 27 has a knurled head and a cone shaped tip (not shown) which fits into a corresponding cup in the bottom of feed screw 26. Pivot 27 which is threaded adjacent to its head, is screwed into the bottom lug 31 of frame 29. By unscrewing pivot 27, feed screw 26 can be removed from the machine.

Feed screw 26 is a triple threaded screw adapted to hold a wire staple 33 such as is shown in Figure 9 at three points of contact, one in each succeeding thread when a staple 33 is threaded upon it. In operation feed screw 26 is threaded with a plurality of staples 33, one of which is shown on the screw in Figures 3, 4 and 8.

Staple 33 is formed with a head 34 and prongs 35 projecting at an angle from its main loop portion. When a staple 33 is held in position on feed screw 26, its head 34 is lodged in groove 36 (Figure 5). Now when feed screw 26 is rotated, staple 33 is kept from rotation due to the lodgement of its head 34 in groove 36, causing thereby staple 33 to travel downward on the threads of feed screw 26. One staple 33 will drop off the bottom of feed screw 26 for each third of a revolution of the feed screw.

The rotation of the three toothed ratchet wheels 30 causes the rotation of feed screw 26. When bar 37 is moved to the left, (as will be explained) link 38 (Figure 6) pivoted to it engages with a tooth of ratchet wheel 30 and causes wheel 30 to be given one-third of a revolution. Bar 37 slides in a guide 39 fastened to main frame 11. The pawl 34 which is normally held in the position shown in Figure 6 by a spring on its pivot (not shown) locks ratchet wheel 30 in its proper positions.

The spout of the stuffing machine shown at 40, Figures 3 and 4 is aimed at the central opening of my machine. Now as the bologna casing which is crowded on the end of spout 40 is being filled with pulp forced into it by the action of the stuffing machine, the bologna takes form and passes through the central opening between the upper and lower pairs of jaw plates 16 and 17 in their position shown in Figure 1. When sufficient length of casing has been stuffed, the valve in the stuffing tube is closed. Hand wheel 13 is now turned, bringing together nuts 14 and 15 moving thereby jaw plate 16 and 17 into the position shown in Figure 2. The jaw plates in their closed position constrict the bologna so that an open staple 33 will fit over the necked down portion.

The size of the opening left between the jaw plates 16 and 17 in their constricted position (Figure 2) must often be varied to suit the various sizes of bologna being bound. For this purpose, plates (not shown) with various sizes of U-shaped notches can be inserted in the jaw plates in the region of the opening.

The lowering of jaw plates 16 leaves plate 18 partially withdrawn and suspended by its hook 19 from pin 41 near the bottom of link 20. In this position plate 21, carried by plate 18, comes opposite the opening 42 in front jaw plate 16 and the notch 43 in rear jaw plate 16. The portion of plate 21 to the left of pivots 22 (Figure 8) is heavier than the portion to the right of these pivots. As a consequence plate 21 swings from its vertical position into a horizontal one. In swinging into its horizontal position plate 21 swings plate 23 also into a horizontal position, the lowering of front jaw plate 16 having brought plate 23 opposite plate 21, the pivots 44 of plate 23 being in the relative position to pivots 22 of plate 21 as shown in Figure 8. Instead of relying entirely on gravity to swing plates 21 and 23 into horizontal positions, coiled springs could be used on pivots 22 to accomplish this result.

With plates 21 and 23 in a horizontal position, just under the bottom of feed screw 26 any staple 33 dropping off it will fall through the notch in plate 23 and rest on the fins 45 of plate 21, the upper portion of plate 21 having a notch of the same form and in alignment with the notch in plate 23.

When bar 46 (Figure 1) is moved to the left, it rotates bell crank lever 47 with one end of which it engages. The other end of bell crank 47 which engages the top of rod 48 pushes down on the rod. In its upper position rod 48 just touches the top of plate 23 (Figure 4). Rod 48 is so set in its guide that its bulbed lower end has a tendency to press horizontally against jaw plate 16, this spring action being furnished by the flexure of the body of rod 48.

When rod 48 is pushed down it causes plates 21 and 23 to swing into vertical positions, the backward spring action of rod 48 ensuring the pressing of plate 21 into position between jaw plates 16. Owing to the fact that the pivots 22 and 44 of these plates are not concentric, as the plates swing around, plate 23 has a sliding motion relative to plate 21. This causes the notch of plates 23 to be displaced with regard to the notch of plate 21, preventing staple 33 from falling out by holding it in the space between the fins 45 of plate 21 and the bottom face of plate 23.

Moving bar 46 to the left (Figure 1), disengages pin 41 from hook 19 letting fall plate 18 into the position shown in Figure 2. Plate 21 being in vertical position slides down with plate 18, bringing a staple 33 over the necked down portion of the bologna.

The next step is to twist prongs 35 of staples 33 about each other completing the closure of the bologna.

Located between jaw plates 17 near their bottom is a substantially U shaped member 49 adapted to slide vertical between four guide bars 50, two for each plate 17. The prongs of member 49 are beveled off on their upper ends. When member 49 is raised, its prongs embrace links 51. Links 51 are carried in notches in the bottom of plate 18. The upper ends of links 51 are rounded fitting into rounded notches in plate 18 and serving as centers of rotation for the links. The other ends of links 51 are beveled off into sharp edges which are adapted to engage a staple 33 at the apices of the angle formed between its prongs 35 and its main portion (Figures 2 and 9).

The raising of member 49 moves the ends of links 51 toward each other squeezing staple 33 around the necked portion of the bologna, until the rounded heads of prongs 35 are brought close enough together to fit into slot 52 (Figure 2) of twisting tool 53. Twisting tool 53 is now rotated (as will be explained) until staple 33 is tightly twisted on the bologna.

Twisting tool 53 is revolvably located in a bore through the center of member 49. In line with the axis of twisting tool 53 and fastened to it, is pinion 54 which passes through a hole in main frame 11 and is protected by housing 55 extending downward from frame 11.

Engaging with pinion 54 is gear 56 fixed to short shaft 57 mounted within main frame 11. To the other end of short frame 57 is fixed bevel gear 58. Bevel gear 59 fastened to short shaft 64 is the mate to bevel gear 58. Short shaft 64 which is mounted in suitable bearings on an extension of main frame 11 carries on it ratchet device 60 adjacent to bevel gear 59. Gear 61 is fixed to shaft 64. Ratchet device 60, the details of which are not shown, is so constructed that when shaft 64 is rotated in one direction by gear 61 it will rotate bevel gear 59 with it, while if shaft 64 is turned in the other direction it will have no turning action on bevel gear 59. Meshing with gear 61 is gear 62 mounted on shaft 65 which is held in suitable bearings on an extension of main frame 11. Gear 62 carries fixed to it a handle 63. When handle 63 is pulled, say, toward the left in Figure 3, twisting tool 53 is rotated, while if handle 63 is moved to the right, twisting tool 53 remains stationary.

The mechanism for pushing bars 37 and 46 and for lifting member 49 and twisting tool 53 into final position will now be explained.

Cam bar 66 is slidably mounted on frame 11 being held in position by screws 67 projecting from frame 11 and passing through slots 68 in cam bar 66. Pin 69 fixed to the upper end of cam bar 66 engages slot 70 of the cam 71. Cam 71 is carried by disc 72 which is loosely mounted near the upper end of closing screw 12. In the upper surface of disc 72 are a series of depressions 73 (Figure 1) located at small intervals in the form of a circle with a radius equal to the distance from the center of closing screw 12 to the center of pin 74. Projecting from hand-wheel 13 is a hollow knob 75 in which pin 74 is slidably mounted. Normally pin 74 is held up out of engagement with disc 72 by means of spring 76. When it is desired to rotate disc 72, pin 74 is depressed against the action of spring 76 until it engages with a depression 73. Rotating hand wheel 13 now rotates cam 71 which raises or lowers cam bar 66 depending on the direction of the rotation.

In the left edge of cam bar 66 (Figure 3) are notches 77 and 78. As cam bar 66 is raised the lower edge of notch 78 engages first with the beveled end of bar 37 pushing it to the left. As the lower edge of notch 78 rises higher it engages the beveled end of bar 46 pushing it to the left. Upon cam bar 66 rising still higher the lower edge of notch 77 engages the substantially horizontal leg of bell crank lever 79 and rotates it.

When jaw plates 17 were raised by the turning of hand wheel 13 the vertical leg of bell crank lever 80 which is pivotally connected to the front jaw plate 17, engaged with pin 83 on the lower end of bell-crank lever 79. The rotation of bell crank lever 79 causes bell crank lever 80 to rotate, and as the horizontal leg of bell crank lever 80 engages with pin 81 fixed to member 49 said member is raised carrying with it twisting tool 53. Pin 81 travels in slot 82 formed in front jaw plate 17. As member 49 is being raised first links 51 are squeezed together bringing the ends of staple 33 together. Then as member 49 and twisting tool 53 go still higher slot 52 fits over the prongs of staple 33.

When cam bar 66 is lowered by turning disc 72 in the reverse direction to that noted above, bar 46 is forced to the right by a spring (not shown) around the pivot of bell crank 47. Bar 37 is forced to the right by compression spring 91 seen best in Figure 6. Bell crank 79 is caused to move into its original position by being pressed down by the top edge of notch 77. This turns the upper leg of bell crank 80 into its vertical position, carrying down member 49 and twisting tool 53. Links 51 are thereupon spread apart by the action of plate springs 87.

The operation is as follows:

My machine is placed on a table of sufficient height, (a suitable hole being provided therein for housing 55) to bring the opening between jaw plates 16 and 17 opposite the spout 40 of the stuffing machine. As the bologna is formed it passes through this opening. When enough of the casing is filled, the pressure is turned off and hand wheel 13 is rotated, operating screw 12 until jaw plates 16 and 17 are brought not quite into the position shown in Figure 2. Pin 74 is in its upper position during this turning, thereby leaving disc 72 stationary. The closing of the jaw plates constricts the bologna to a circle of small enough diameter to let the staple 33 drop upon it.

Feed screw 26 carries a charge of staples 33, having been previously removed from the machine and threaded with them.

Now in order to drop a staple 33 on the constricted portion of the bologna, pin 74 is pressed down into engagement with a depression 73 in disc 72 and hand wheel 13 is given a further rotation moving around with it disc 72. This further rotation of hand wheel 13 brings the jaw plates into the position shown in Figure 2. Disc 72 carries around with it cam 71, lifting up thereby cam bar 66 and causing the bottom of notch 78 to push bar 37 to the left. This motion of bar 37 causes a one-third turn to be given to feed screw 26 and drops a staple 33 on plate 21 which has already assumed its horizontal position. Further motion of disc 72 causes plate 18 to be unhooked from its supporting pin 41. But just before this unhooking takes place rod 48 has pushed plate 21 into its vertical position, so that it slides down with plate 18 between jaw plates 16. As disc 72 is rotated still more, through the agency of bell cranks 79, 80 and member 49, the links 51 squeeze the prongs of staple 33 together so that as twisting tool 53 rises, the prongs enter its slot 52. The slot 52 of twisting tool 53 is enlarged at the center to form the circular hole 88. The width of slot 52 is substantially equal to the diameter of the staple wire. The hole 88 at the center of slot 52 is to provide the additional space required by the prongs when twisted one over the other.

The twisting of the staple is accomplished by operating handle 63 back and forth until a sufficient amount of twist has been given to the staple. All the parts are then returned to their initial positions and the operation is completed.

In order to be sure that slot 52 is always in the right plane to fit over the prongs of staple 33 a spring catch is provided which acts upon the upper surface of the web of gear 56. A bolt 89 is set in a suitable hole in main frame 11. A spring 90 normally presses bolt 89 down upon gear 56 which is provided at the proper points with slight indentations (not shown) into which the bolt 89 springs when opposite one of them.

A modification of the binding operation that could be used would be to omit the step where the bologna is constricted by the jaw plates. In this case the staple would be large enough to place on the full size of the bologna and the constricting and sealing would be accomplished by twisting the prongs of the staple until it had closed the end of the bologna.

In Figure 10 which shows a pair of bolognas made in acordance with my invention, the bologna 85 has its ends closed by staple 33. The bolognas can be made in a string and cut off afterwards. One way would be to have two staples as 33ᵃ and 33ᵇ between each bologna so that when separated both would be sealed, or the bologna could be made in a string with only one staple between the succeeding bolognas.

The head 34 (Figure 9) of the staple 33 serves as a handle for holding the staple against twisting as a whole when the prongs 35 are twisted about each other. The loops at the ends of prongs 35 also serve as a gripping means when the prongs are twisted by the twisting tool 53. The head 34 can also serve as a hanger for the bologna by threading it with string.

The bellying out of the main portion of staple 33 prevents it from falling out of plate 21 when said plate is held in its vertical position.

For certain types of bolognas, such as strings of sausages (Figure 12) it is not always necessary to twist the staple or fastener on the bologna. If the material of the fastener is stiff enough it is only necessary to pinch the fastener on the bologna. A flat strip fastener 86 such as is shown in Figure 11 is suited to this purpose. The points of squeezing links 51 (Figures 1 and 2) would grip this fastener just at the angles between its short prongs and its main body. Using a fastener as 86 would permit the doing away with twisting tool 53 and its operating mechanism in the binding machine.

The word bologna as used in the claims is intended to cover the idea of food bags containing food in divided or macerated forms or food materials with various degrees of fluidity, the contents of the bag being forced in under pressure.

I claim:—

1. A holder of fasteners for a bologna binding machine consisting of a plural threaded screw adapting it to hold each fastener at a plurality of points of contact, one point in each consecutive thread.

2. In a mechanism for binding bolognas, a battery of fasteners, a holder upon which said fasteners are mounted, means for discharging said fasteners from said holder, means for receiving the discharged fasteners and placing them on the bolognas, means for tightening said fasteners on the bolognas and actuating mechanism for automatically effecting the operation of said several means in predetermined timed relation.

3. A mechanism for binding bolognas comprising a holder adapted to carry a plurality of separate fasteners, means for placing said fasteners on the bolognas and means for tightening said fasteners on said bolognas.

4. A mechanism of the character described, comprising means for placing a metallic fastener on a bologna and means for twisting said fastener about itself while on said bologna.

5. A mechanism of the character described, comprising a holder adapted to carry a plurality of wire fasteners, means for placing a fastener on a bologna and means for locking said fastener about said bologna.

6. A mechanism for binding bolognas comprising means for placing a substantially U-shaped fastener over the bologna and means for twisting the ends of the fastener about each other.

7. A mechanism for binding bolognas having an opening therein adapted to be placed opposite to the end of the spout of the stuffing machine, means for contracting the size of said opening after the bologna has been pushed through said opening, means for placing a loop fastener on the contracted portion of the bologna and means for twisting the ends of said fastener about each other thereby further contracting said bologna.

8. A mechanism for binding bolognas comprising means for constricting the bologna, a holder having a plurality of fasteners, means for discharging said fasteners from said holder, means for receiving the discharged fasteners and placing them on the constricted portion of the bolognas, means for tightening said fasteners on the bologna and actuating mechanism for automatically effecting the operation of said several means in predetermined timed relation.

9. A mechanism for binding bolognas comprising means for constricting the bologna, means for placing a metallic fastener on the constricted portion of said bologna and means for twisting said fastener about itself.

10. A mechanism of the character described, comprising means for constricting a bologna, a holder adapted to carry a plurality of fasteners, means for feeding the fasteners from the magazine into place on the constricted portion of the bologna and means for tightening said fasteners on the bolognas.

11. A mechanism of the character described, comprising means for placing a fastener on a bologna, means for squeezing said fastener on the bologna and means for twisting said fastener.

12. A holder of fasteners for a bologna binding machine consisting of a screw on which said fasteners are adapted to be threaded, said holder being suitably constructed to be given rotation when mounted in the binding machine.

13. A holder of fasteners for a bologna binding machine, consisting of a triple threaded screw adapting it to hold each fastener at three points of contact, one point in each consecutive thread.

14. In a mechanism for binding bolognas, a battery of fasteners, a holder upon which said fasteners are mounted, means for revolving said holder whereby the fasteners are discharged, mechanism for receiving the discharged fasteners and placing them on the bolognas and means for tightening said fasteners on the bolognas.

15. A holder of fasteners for a bologna binding machine consisting of a screw adapted to have a plurality of wire staples threaded upon it said screw being adapted for mounting in the machine.

16. A mechanism for binding bolognas consisting of a plurality of jaw plates, means for closing the opening between said jaw plates by moving them together and means for fastening a binder on the bologna, said fastening means being located between said jaw plates.

17. In a mechanism for binding bolognas, a pair of oppositely moving constricting members, and a reversely threaded screw adapted to move said members toward each other.

18. A mechanism for binding bolognas, comprising means for constricting a bologna, means for placing a fastener on the constricted portion, means for squeezing the ends of the fastener towards each other and a twisting tool, having a socket adapted to receive the squeezed together ends of the fastener, for twisting said fastener tightly about the bologna.

19. A mechanism for binding bolognas comprising two pairs of oppositely movable constricting members between which the bologna is squeezed, one pair being adapted to move within the opposite pair, means for placing and fastening a binder on the constricted portion of the bologna, said means operating between the inner surfaces of said constricting members.

20. A mechanism for binding bolognas comprising oppositely movable members with an opening between them, said opening being adapted to receive the bologna, means for moving said members toward each other thereby constricting the bologna, means for placing a fastener on the constricted portion, means for squeezing the ends of the fastener toward each other, and means for twisting the squeezed together ends of the fastener about each other.

21. A mechanism for binding bolognas comprising two pairs of oppositely movable jaw plates with an opening between them, said opening being adapted to receive the bologna, means for moving said members toward each other thereby constricting the bologna, a pair of squeezing devices pivotally mounted between one pair of jaw plates, a substantially U-shaped member slidably mounted between the other pair of jaw plates and adapted to embrace the squeezing devices causing them to swing towards each other whereby the ends of the fastener are squeezed towards each other, and means for twisting the squeezed together ends of the fastener about each other.

MAX THEIMER.